United States Patent [19]

Wildermuth et al.

[11] Patent Number: 4,525,717
[45] Date of Patent: Jun. 25, 1985

[54] POSITION DISPLAY INSTRUMENT

[75] Inventors: Eberhard Wildermuth, Leinfelden-Echterdingen; Dirk Jansen, Ueberlingen/Bodensee; Rudolf Burkhardt, Stuttgart; Joachim Merz, Esslingen-Mettingen, all of Fed. Rep. of Germany

[73] Assignee: Universität Stuttgart, Institut Für Flugnavigation, Stuttgart, Fed. Rep. of Germany

[21] Appl. No.: 293,953

[22] Filed: Aug. 18, 1981

[30] Foreign Application Priority Data

Aug. 19, 1980 [DE] Fed. Rep. of Germany ....... 3031258

[51] Int. Cl.³ .......................... G01C 21/20; G01S 5/02
[52] U.S. Cl. .......................................... 343/452; 434/3; 343/451; 364/449
[58] Field of Search .................. 343/451, 452, 6 TV; 434/3; 364/444, 449

[56] References Cited

U.S. PATENT DOCUMENTS

| 3,299,539 | 1/1967 | Leiber | 343/452 |
| 4,071,895 | 1/1978 | Wood et al. | 343/452 |
| 4,470,119 | 9/1984 | Hasebe et al. | 364/449 |

Primary Examiner—Theodore M. Blum
Assistant Examiner—Gregory C. Issing
Attorney, Agent, or Firm—Lee, Smith & Zickert

[57] ABSTRACT

A position display instrument for light spot display on a map of the position of vehicles, in particular aircraft or helicopters. The instrument comprises a flat map holder for accommodating and holding map sheets in an exact position, a light transmitter located below the map holder for producing a light spot on the map sheet and movable in two coordinates by positioning means, a microcomputer to which the grid coordinates of the vehicle position are applied from a navigational computer and by which the positioning means are controlled, a memory for storing map data, said memory cooperating with the microcomputer, and display means which is connected to the microcomputer and by which the map sheet or map field required for the respective grid coordinates is displayed.

4 Claims, 15 Drawing Figures

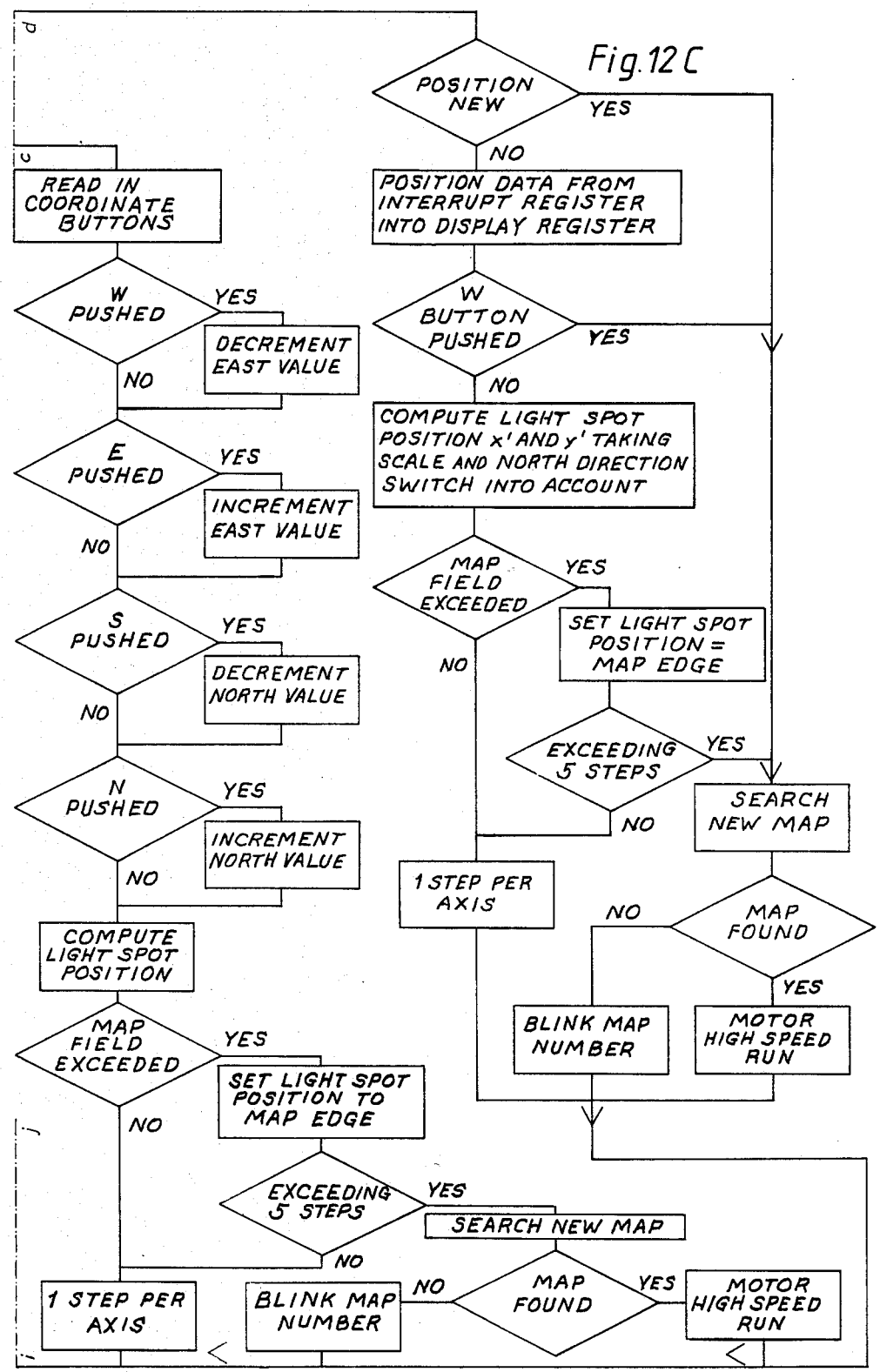

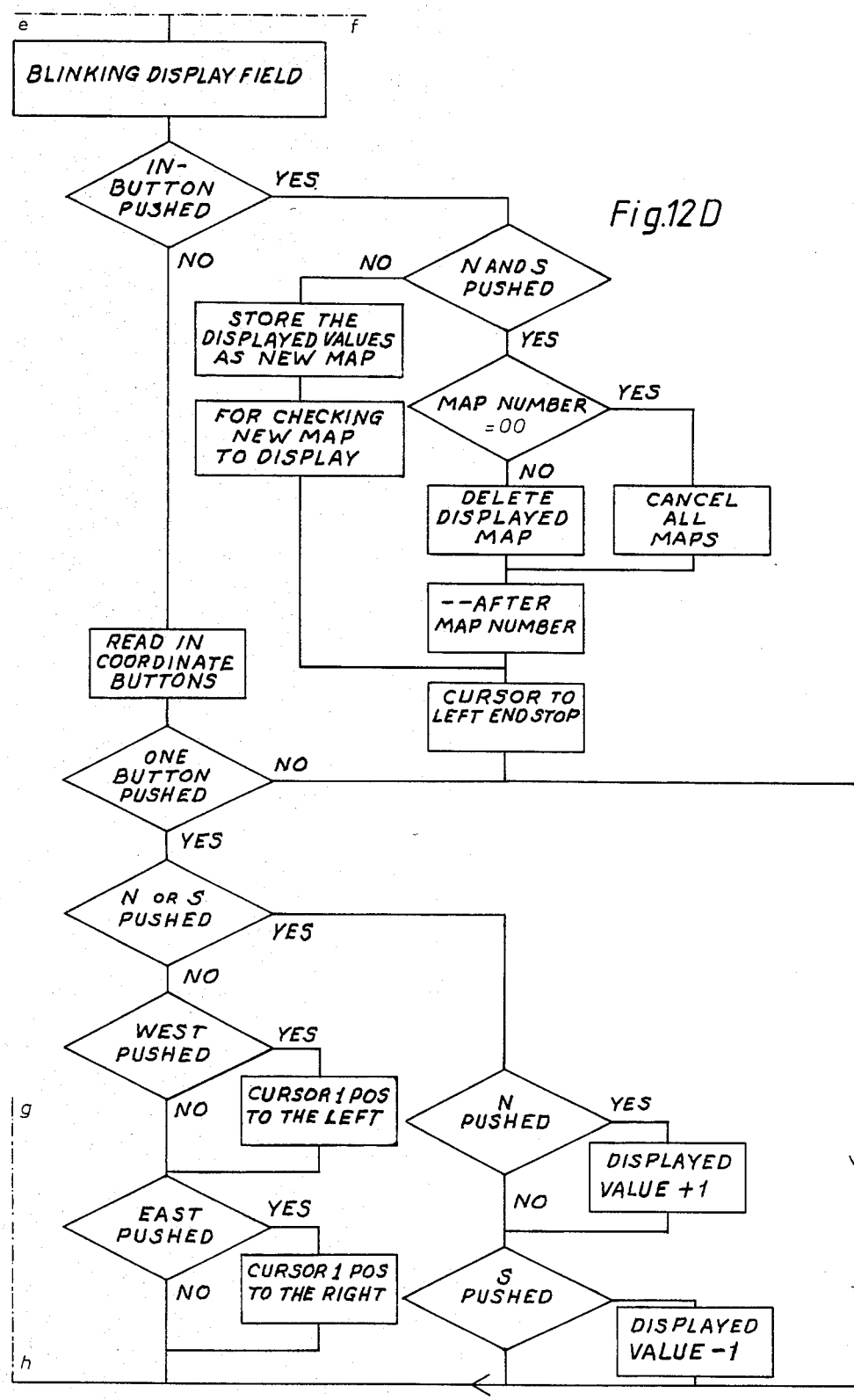

POSITION DISPLAY INSTRUMENT

BACKGROUND OF THE INVENTION

Navigational instruments for aircraft which continously provide the position of the aircraft in a UTM grid coordinate system are known. Such navigational instruments may, for example, comprise Doppler radar equipment which continuously measures the ground speed of the aircraft. From this speed, the heading provided by the compass unit, and the flight time, the distance components associated with the flight path covered are computed continuously, and the grid coordinates of the aircraft position are continously formed therefrom. The digital position display obtained thereby is not very illustrative and would have to be laid off on a map. This would stress and distract the pilot in an undesirable manner.

SUMMARY OF THE INVENTION

For this reason the grid coordinates of the aircraft position are applied to a position display instrument. Such a position display instrument comprises a flat map holder for accommodating and holding map sheets in an exact position. These sheets may be map sheets which have been cut out of a larger map along UTM grid lines and are mounted in a map pocket, which is then placed on the map holder in an exact position. However, original maps may also be used, which are retained on the map holder with well-defined map fields. A light transmitter is located below the map holder and is movable in two coordinates by positioning means and produces a light spot on the map sheet. A microcomputer receives the grid coordinates of the aircraft position from a navigational computer. The positioning means of the light transmitter are controlled by the microcomputer such that the light spot displays the position of the aircraft or helicopter. In order to make sure that the correct map has been placed on the map holder, a memory for storing map data is provided, which cooperates with the microcomputer. Display means are connected to the microcomputer and serve to indicate which map sheet or map field is required for the respective grid coordinates.

In normal operation the pilot has prepared a set of map data, namely scale and coordinates, together with an identification associated with the respective map sheet, for example a number, which are stored in the memory. The microcomputer ascertains whether the aircraft position provided by the navigational computer is found on one of the map sheets, and in this case the number and the data of the respective map sheet are displayed by display means. Thus, the pilot need only to select the indicated map sheet and to place it in a fixed position on the map holder in order to be sure that the aircraft position is correctly displayed on the correct map by the light spot produced by the light transmitter.

It is the object of the invention to provide an improved design of a position display instrument with the characteristics described above.

According to the invention this object is achieved in that (a) the microcomputer comprises means for determining $$x' = \frac{x - x_M}{M} + a$$

$$y' = \frac{y - y_M}{M} + b.$$

wherein
- x, y are the grid coordinates of the aircraft position as provided by the navigational computer,
- $x_M, y_M$ are the coordinates of the map center as provided by the memory,
- M is the map scale and
- a,b are half the height and width dimensions, respectively, of the map sheet or map field, (b) the light transmitter is controlled by the positioning means to automatically be positioned at the coordinates thus determined with respect to one map corner, (c) means are provided for supplying an edge signal to the microcomputer when the light transmitter reaches the edge of the map sheet or map field, and (d) the microcomputer, when receiving the edge signal, (d$_1$) forms x' and y' consecutively for the various map data $x_M, y_M$ stored in the memory, (d$_2$) tests, each time, for the condition $$0 \leq x' < 2a$$

$$0 \leq y' < 2b$$

and (d$_3$) when this condition is met
- (d$_{31}$) discontinues further testing,
- (d$_{32}$) supplies the identification of the associated new map sheet for display to the display means, and
- (d$_{33}$) controls the positioning means to move the light transmitter into the position $$x' = \frac{x - x_{M1}}{M} + a$$

$$y = \frac{y - y_{M1}}{M} + b \text{ and,}$$

(d$_4$) when this condition is not met with any of the stored pairs $x_M, y_M$, provides a nil return.

BRIEF DESCRIPTION OF THE DRAWINGS

A preferred embodiment of the invention is described in greater detail hereinbelow with reference to the accompanying drawings, in which.

DESCRIPTION OF THE PREFERRED EMBODIMENT

Figure 1:
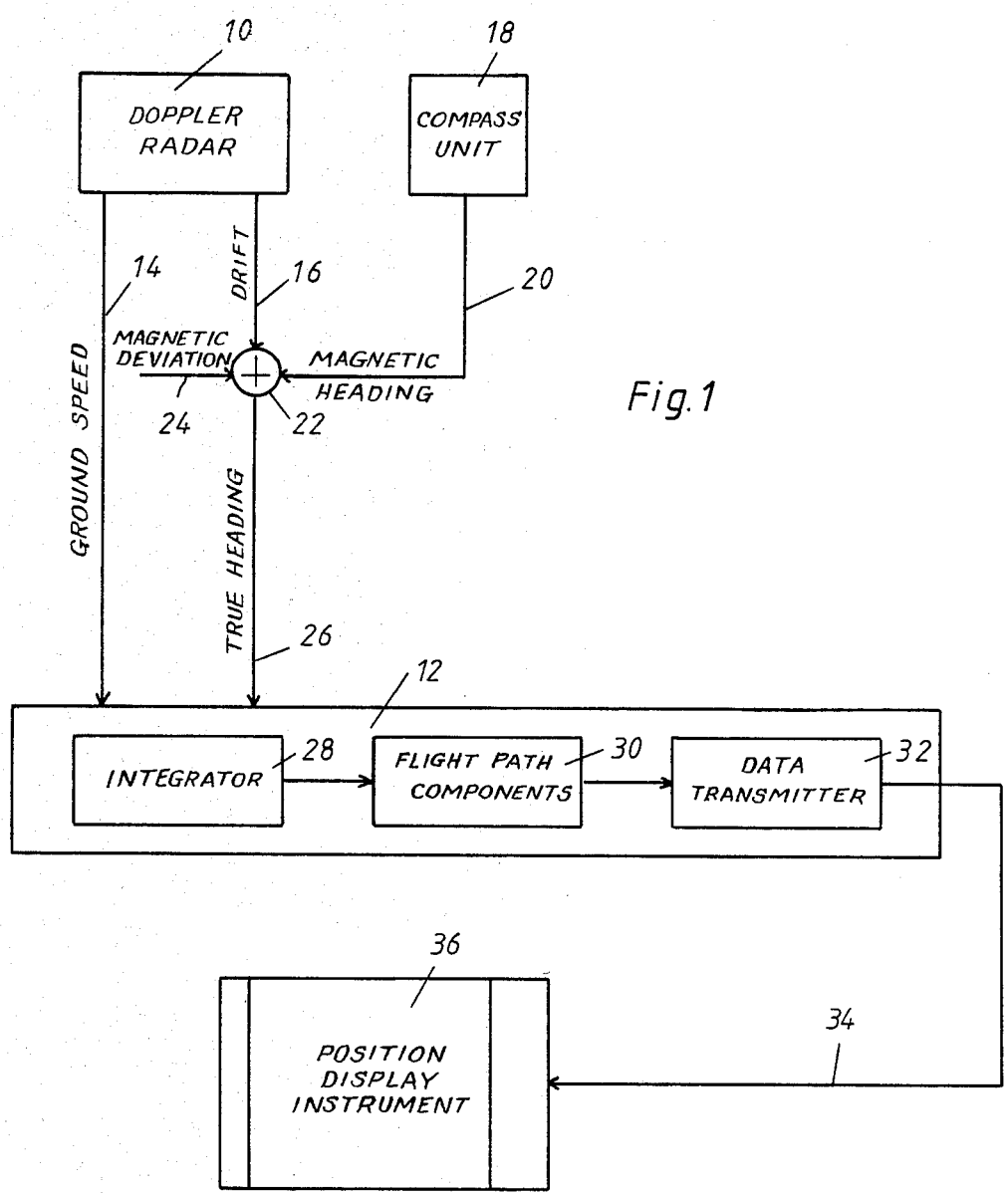
FIG. 1 is a block diagram of the navigational computer and the position display instrument.

Referring to FIG. 1, numeral 10 designates a Doppler radar attached to an aircraft. The Doppler radar supplies the ground speed of the aircraft to a navigational computer 12, as indicated by arrow 14. Furthermore, it provides the drift of the aircraft, as indicated by arrow 16. A compass unit 18 provides the magnetic heading, as indicated by arrow 20. At 22, the magnetic heading is corrected in conventional manner for the drift angle and for the actual local magnetic deviation (arrow 24) provided by navigational computer 12 in a manner not shown. The true heading is thus obtained and is also supplied to the navigational computer 12, as illustrated by the arrow 26. Speed and true heading provide the speed components. From these components, the components of the flight path, the position of the aircraft with reference to an initial point, are formed by an integrator 28 of the navigational computer 12, as indicated by block 30. The position signals thus obtained are applied by a data transmitter 32 on line 34 to the position display instrument 36.

This is known technology, which therefore is not described in detail.

Figure 2:
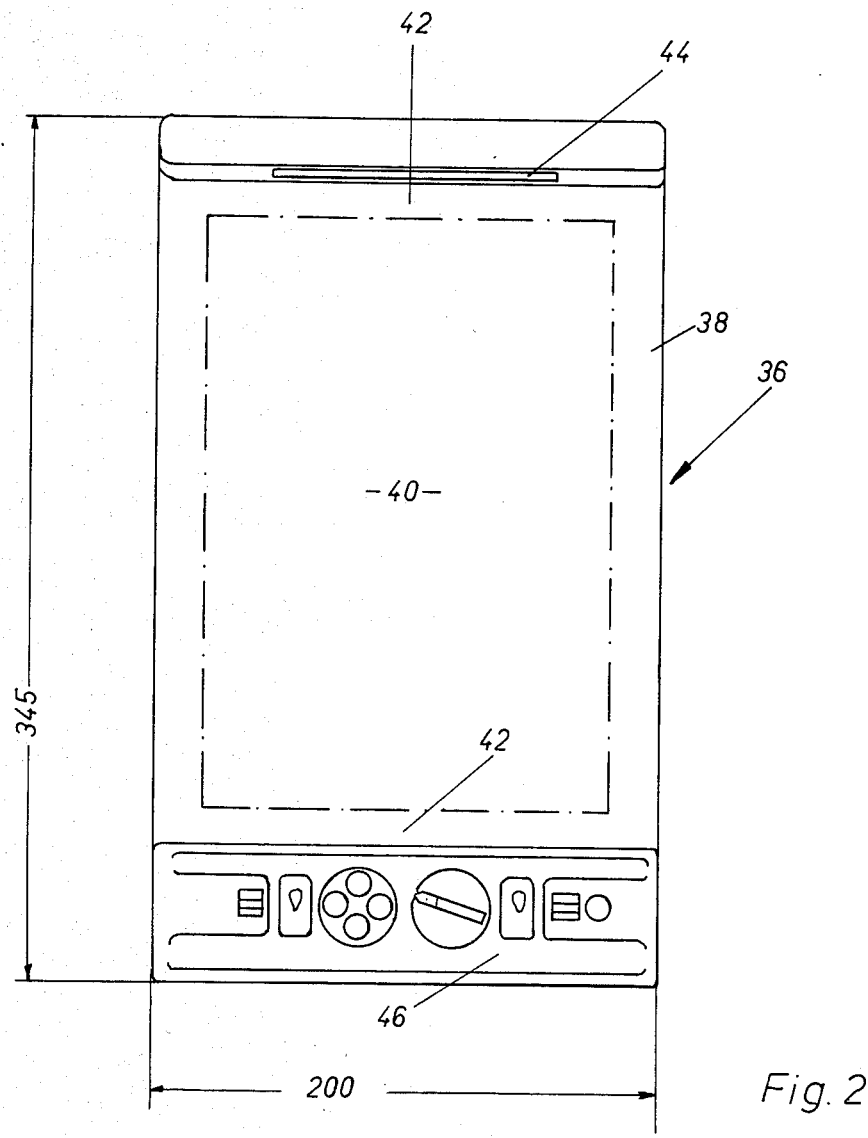
FIG. 2 is a plan view of the position display instrument.
Figure 3:
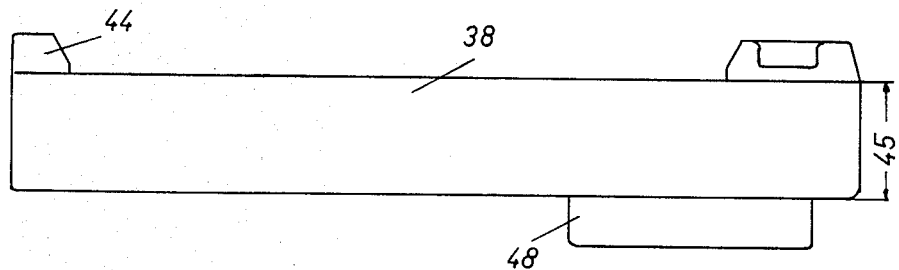
FIG. 3 is a side elevation thereof.

The position display instrument comprises a generally shallow, rectangular housing 38, which forms a rectangular, flat map holder 40 on its upper surface. The map holder 40 comprises means for holding map sheets in an exact position. Map sheets which are contained in rectangular, transparent map pockets shaped to the dimensions of the map holder can be placed in engagement with stops and, in addition, can be held accurately in place by pins 42, which extend through holes of the map pocket. At the upper end in FIG. 2, the instrument includes a display field 44 with digital display means, as will be explained in greater detail below with reference to FIG. 5. A control panel 46 is provided on the lower edge of the housing 38, as viewed in FIG. 2, as will be explained below with reference to FIG. 4. On its lower surface, the housing 38 carried padded elements 48, with which the instrument is held on the pilot's knee and is secured against lateral movement.

Figure 7:
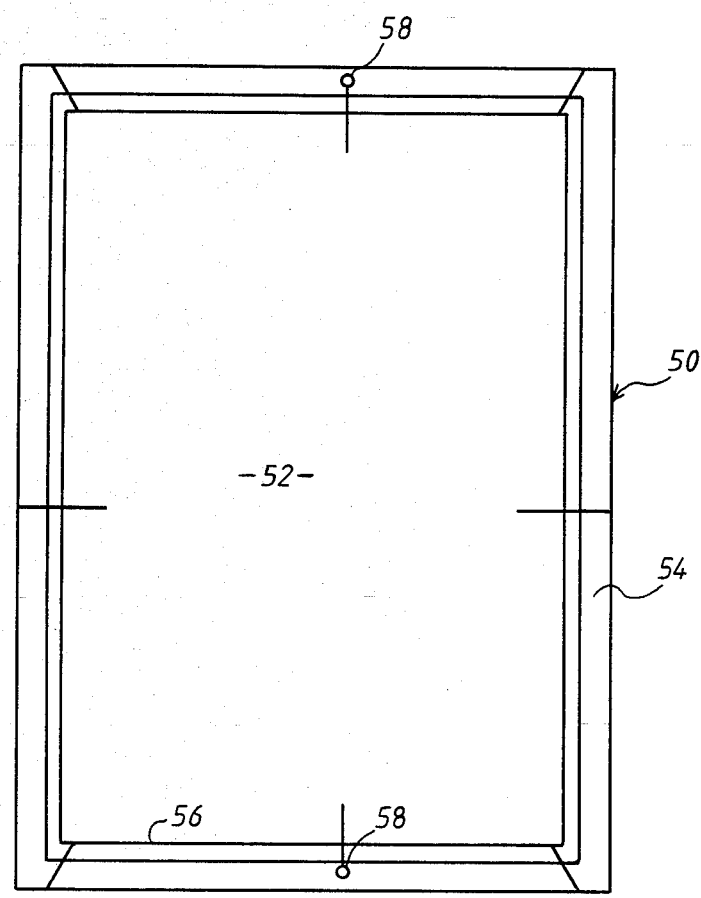
FIG. 7 shows a map pocket used with the position display instrument for accommodating the map sheets.

FIG. 7 shows a map pocket 50 with a transparent base 52, on which the map sheets lie, a spring steel ledge 54 and a transparent ledge 56 extending over the map sheets and holding them. The map sheets are retained between the base 52 and the ledge 56. The map pocket 50 is placed on the map holder 40 and is held centered by stops and by holes 58, which are secured on the pins 42.

Figure 5:
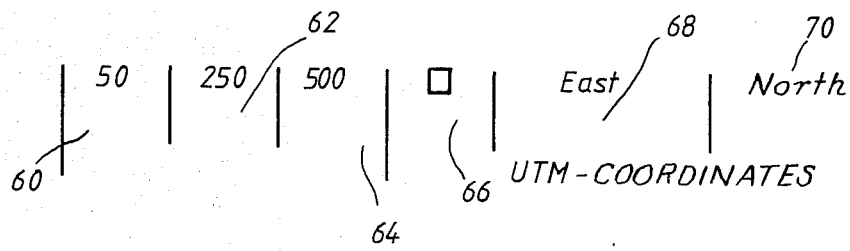
FIG. 5 shows the arrangement of the digital display means on the position display instrument.

The display field with the digital display means is illustrated in FIG. 5. The display field comprises three two-digit LED-, LCD-, or filament display windows 60,62,64. Depending on which scale, namely 1:50,000, 1:250,000 or 1:500,000, has been selected, the number of the map sheet or map field to be used will appear in window 60,62 or 64. In a two-digit window 66, the alphabetic identification of the UTM-one hundred kilometer square will appear. Finally, two four-digit windows 68 and 70 are provided, in which the position indication in East and North position coordinates appears. With the conventional UTM coordinate system, this position indication is unambiguous throughout eighteen degrees of longitude and latitude.

The display fields 68 and 70 can also be used to display the coordinates of targets on the map to which the light spot of the position display is set, in a manner described below.

Figure 4:
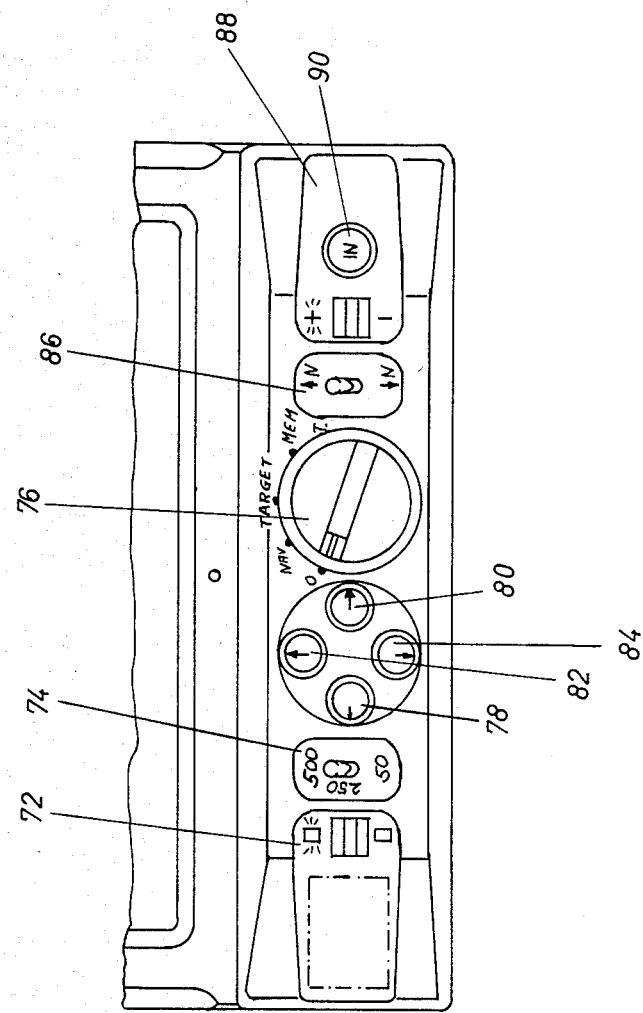
FIG. 4 shows the control panel of the position display instrument.

FIG. 4 shows details of the control panel. Numeral 72 designates a toggle switch, by which the illumination of the map field can be controlled. Three map scales of 1:50,000, 1:250,000 and 1:500,000 can be set by means of a toggle switch for selecting the modes of operation. The rotary selector switch can be switched into the five modes of operation of "O", "NAV" (=navigation), "TARGET" (=manual control of the light spot to move to a target given on the map), "MEM" (=reading in of map data into the memory) and "TEST". In the mode of operation of "TARGET", the light spot can be controlled manually by four push-buttons 78, 80, 82 and 84, while in the mode of operation of "MEM" the push-buttons serve to read in map data into the memory. A change-over switch 86 permits taking into account whether the map sheet has been mounted such that the North direction is on the top in FIG. 4, which corresponds to the usual reading of a map, or whether the map is mounted such that the South direction points to the top. The latter arrangement of the map sheet is advantageous and facilitates orientation, if the direction of flight is predominantly towards South. Finally, a toggle switch 88 permits variation of the brightness of the light spot and of the digital display means. A button 90 permits the transfer of the data displayed by the display means (FIG. 5) to the memory in the mode of operation of "MEM".

Figure 6:
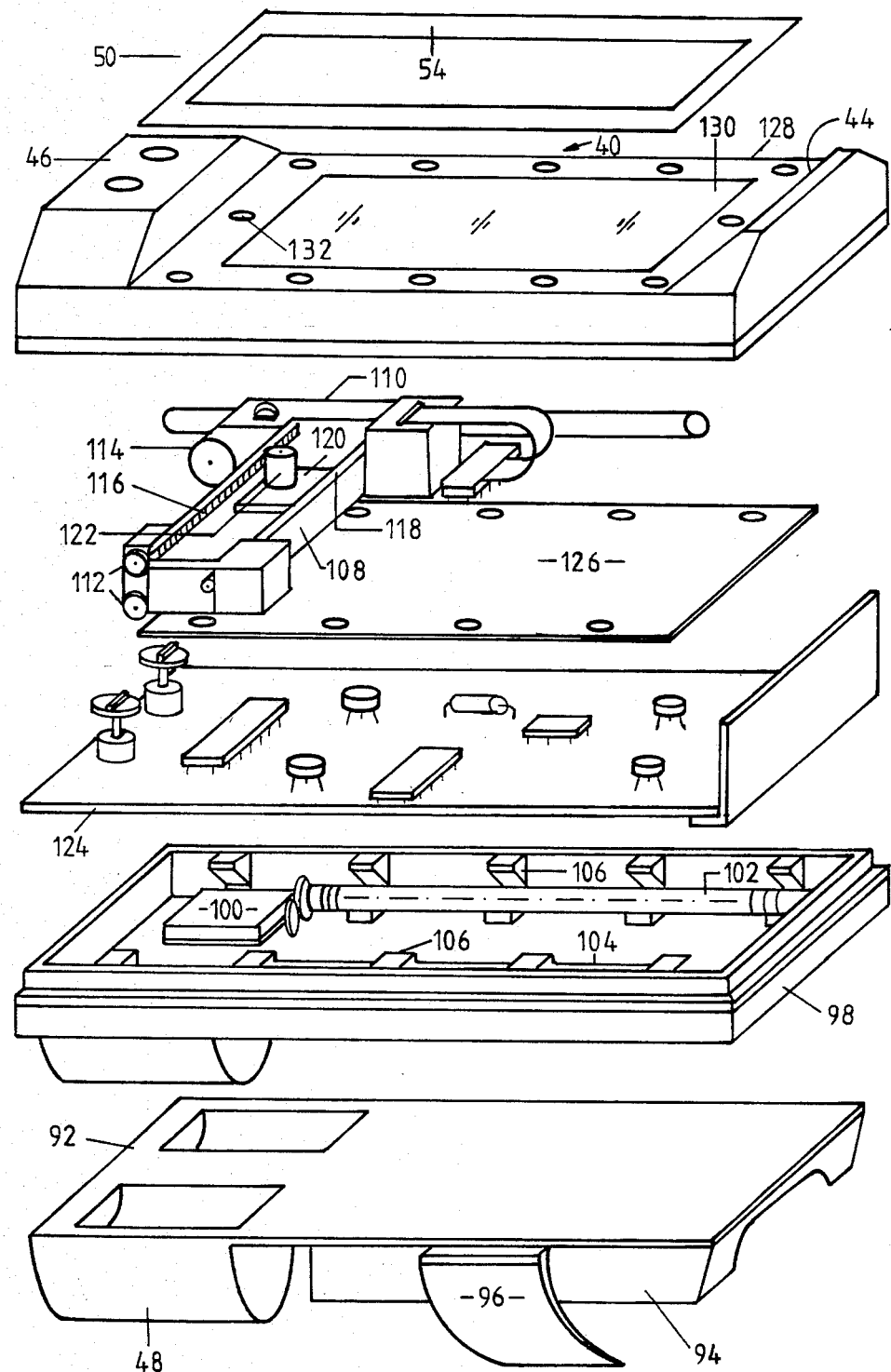
FIG. 6 is a perspective exploded view of the mechanical structure of the position display instrument.

The mechanical structure of the instrument is shown in perspective exploded fashion in FIG. 6.

The housing 38 comprises a lower housing portion 92 with fixed projections 48 for holding the instrument on the pilot's knee. Furthermore, a movable knee holder 94 is provided. A belt 96 is attached thereto, which can be passed around the pilot's upper thigh and tightened so that the instrument is held safely on the pilot's knee. A lower, frame-like housing portion 98 is arranged on the lower housing portion. Housing portion 98 carries a stepping motor 100, which carries a spindle 102 for the Y-drive of the light transmitter. The threaded spindle 102 is arranged along a longitudinal side of the lower housing portion 98. A guide rod 104 extends along the opposite longitudinal side. In order to avoid vibrations which might occur at certain speeds, the spindle 102 and the guide rod 104 are supported along the longitudinal sides by means of a plurality of support members 106. A bridge 108, which extends between the spindle 102 and the guide rod 104, is guided on the spindle 102 by means of a split nut 110 and on the guide rod 104 by means of rollers 112 such that the bridge 108 is able to move past the support members 106. The bridge 108, in turn, carries a stepping motor 114 which drives a threaded spindle 116 extending along the bridge in X-direction and normal to the spindle 102. A carriage 120 is guided on the spindle 116 and a guide rod 118, a light transmitter 122 for producing a light spot on the map sheet being mounted on the carriage 120. A microcomputer, among others, with an INTEL 80,85 microprocessor as central unit, a power supply, and components for the control of the instrument are mounted on an electronic bottom plate 124, which can be inserted into the lower housing portion 98 and is located below the spindle 102 and guide rod 104. An electroluminescent source 126 is provided above the electronic bottom plate 124 and serves to illuminate the map sheet uniformly in the darkness.

An upper housing portion 128 comprises the control panel 46 and the display field 44. The map holder 40 is provided therebetween and includes a rectangualer aperture closed by a glass plate 130. A rim is formed around the aperture, and foil magnets 132 are embedded in said rim. The ledge 54 made of spring steel of the map pocket 50 adheres to these foil magnets.

Figure 8:
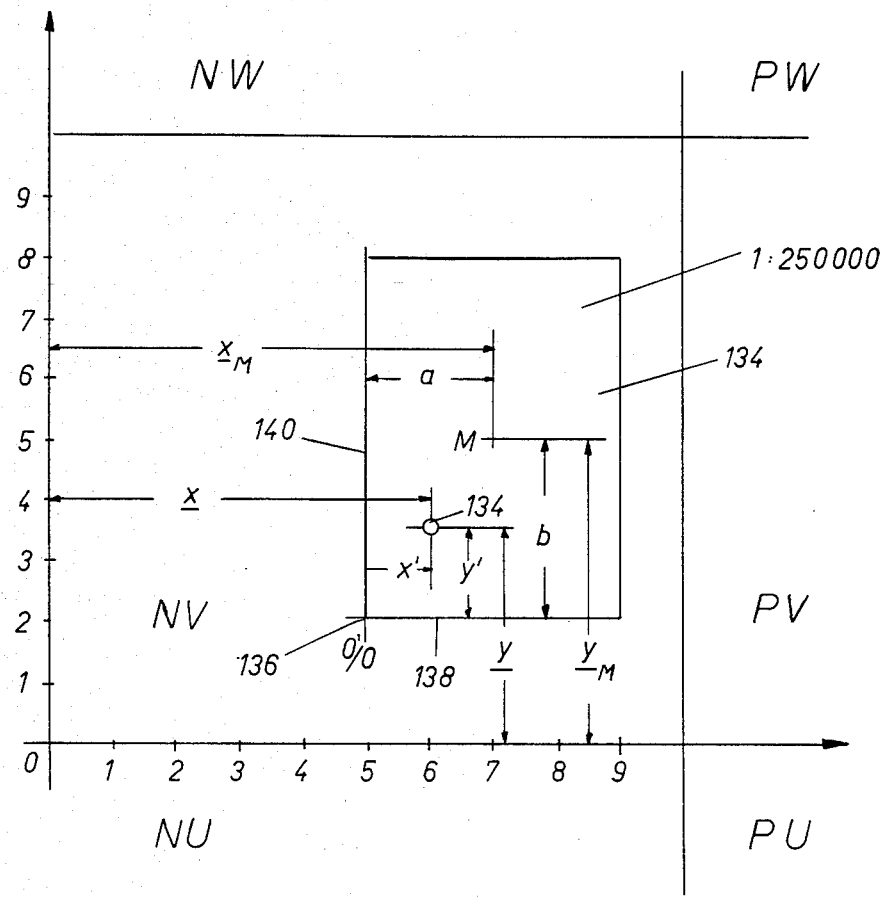
FIG. 8 is a schematic illustration of the relations of the various coordinates.

In FIG. 8, a grid coordinate system is illustrated. The grid coordinate system comprises one hundred kilometer squares, which are designated by pairs of letters, for example NV. The position coordinates in this grid coordinate system are designated by x and y. A map sheet 134 covers an area which is limited by grid lines of the UTM grid, and the center M of the map sheet is located on the intersection of two grid lines. The dimensions of the grid sheet are 2a and 2b, respectively. The coordinates of the light spot 134 which indicates the position of the vehicle, are designated by x',y' in a coordinate system the origin of which is located in the left lower corner 136 of the map sheet 134, and the axes of which extend along the lower and left edges 138 and 140, respectively, of the map sheet 134.

The instrument operates as follows:

When preparing the flight (or some other vehicle mission), an original map 142 (FIG. 9) of the area to be flown over or to be traversed is subdivided into map sheets, which are cut along grid lines of the UTM grid such that each map center M is located on the intersection of two grid lines. If necessary, individual map sheets may be cut off by the boundaries of the original map, as can be seen from FIG. 9. The individual map sheets are numbered in continuous sequence. In addition the UTM coordinates are assigned to each map sheet. The map sheets are placed in map pockets 50 (FIG. 7) such that the centers M coincide with the centers of the map pockets 50 and the UTM grid lines are parallel to the edges of the map pocket.

The numbering and the associated coordinates of the map centers are read in into a memory as "map data", said memory being a random access memory (RAM) in the present case. The reading-in is effected in the following manner:

The rotary selector switch 76 is set into the position "MEM". By means of the push buttons 78 and 80, the respective addressed window of the display means (FIG. 5) can be shifted to the left or to the right. The respective addressed window can be recognized by the fact that the reading appearing in this window flickers. By actuating the push buttons 82 and 84, the reading in this window may be increased or decreased in steps. If, for example, switch 76 is in the position "1:500,000", which corresponds to the scale of the map used, the reading in window 64 will flicker. Then this reading can be changed, for example, to 01 by actuating the push buttons 82 or 84. Pushing the button 80 now causes the right display field in window 66 to respond, the reading in this field being brought to "U" by means of the push buttons 82 and 84. Additional pushing of the push button 80 causes the reading in window 68 to flicker, which reading is set to "4000" by means of the push buttons 82 and 84. (At the scale of 1:500,000, the distance between two grid lines corresponds to the reading "4000, which corresponds to the first "4" in the center coordinates of the map sheet 01). In similar manner the reading in window 70 is set to "4000". Then this reading is transferred to the memory by pushing the push button 90. In similar manner the map data of the remaining data sheets are read in into the memory.

In the position "NAV" of the rotary switch 76, the microcomputer forms x' and y' (FIG. 8) in accordance with the relation $$x' = \frac{x - x_M}{M} + a$$

$$y' = \frac{y - y_M}{M} + b.$$

Therein x and y are the grid coordinates of the vehicle position still stored in the position computer, $x_M$ and $y_M$ are the coordinates of the map center. The associated map sheet is indicated by the display means. The pilot then needs only to place this map sheet on the map holder 40. The microcomputer controls the stepping motors 100 and 114 such that the light transmitter 122 is automatically caused to follow the coordinates x',y' thus determined with reference to a map corner. The stepping motors 100 and 114 with the associated adjusting spindles 102 and 116 constitute the positioning means for the light transmitter. Means are provided for supplying an edge signal to the microcomputer, when the light transmitter 122 reaches the edge of the map sheet or map field. The control of the stepping motors 100 and 116 can be effected in the manner as described in German Offenlegungsschrift No. 28 05 363,6 and U.S. Pat. No. 4,264,848 issued on Apr. 28, 1981.

When the edge signal is received and when the position of the aircraft or vehicle leaves the presently used map sheet, the microcomputer forms successively x' and y' for the various map data x and y stored in the memory. The microcomputer tests, in each case, whether for these data $$0 \leq x' < 2a \text{ and}$$

$$0 \leq y' < 2b.$$

If this condition is met with a pair $x_{M1}$, $y_{M1}$ of these stored map data, the microcomputer will discontinue the further testing. The identification of the associated new map sheet is supplied to the display means 44 (FIGS. 2 and 5) for display. The positioning means 100,116 are controlled to move the light transmitter 122 to the position $$x' = \frac{x - x_{M1}}{M} + a$$

$$y' = \frac{y - y_{M1}}{M} + b.$$

Figure 9:
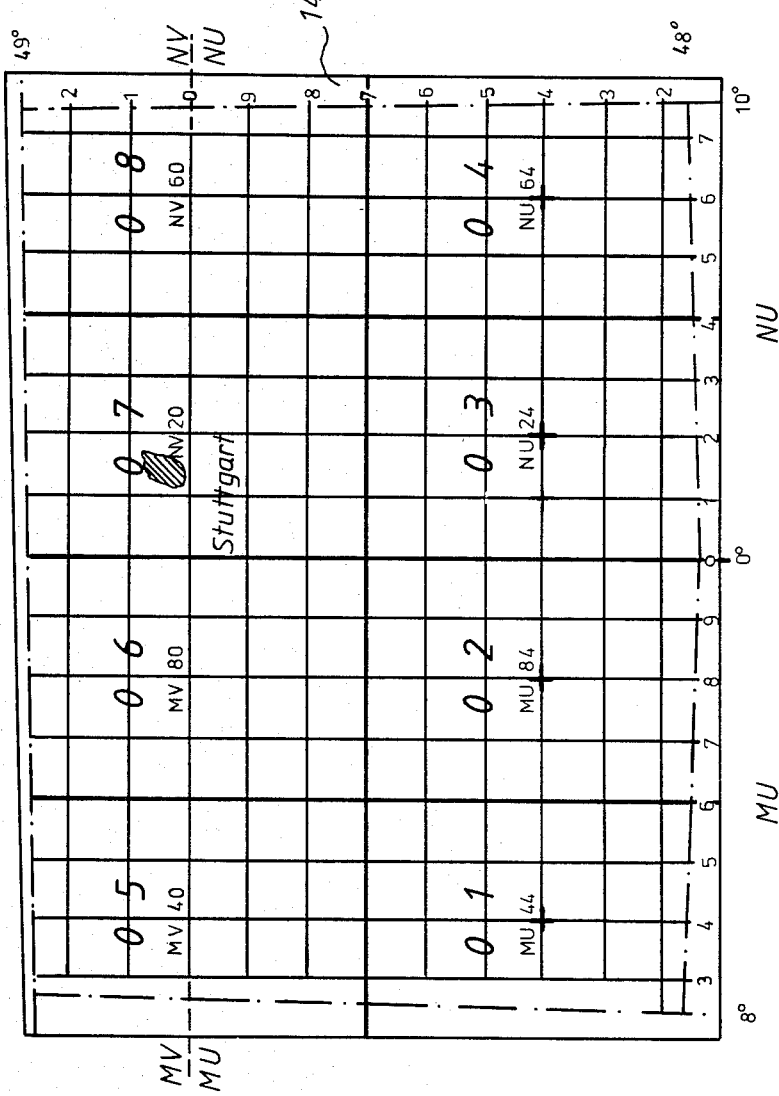
FIG. 9 is an example of the designation and geographic arrangement of the various map sheets used with the position display instrument.

This means that the light transmitter sweeps, for example, from the righthand (East) edge of one map sheet, for example of the map sheet 03 in FIG. 9, to the lefthand edge, and the display "04" appears, which means that the new position of the light spot corresponds to the position of the aircraft in the adjacent map sheet 04. If the values for x' and y' are not fulfilled with any one of the stored pairs $x_M, y_M$, the microcomputer will provide a nil return, for example in that the sign "——" appears in window 62 (with the scale 1:250,000 set) and flickers.

It is also possible to store the map data of a certain "atlas" of map sheets in an interchangeable, programmable read-only memory (PROM), which then represents the memory for storing the map data and, when another "atlas" is used, can be replaced by another read-only memory. Thereby the need of reading in the map data can be eliminated in preparation for the flight.

In conventional map, North is on the top and South is on the bottom. If the direction of flight is predominantly towards South, the pilot who has the map in front of him is forced to mentally convert the display with "North in front" into the field of view observed by him, in which South is in front. This can be avoided by changing-over the control of the positioning means 100,1414 such that the light transmitter is caused to follow the points (2a-x', 2b-y'). Then the pilot may place the map sheet upside down on the map holder 40, such that South is on top in FIG. 2, thus forward of the pilot, and the orientation of the map coincides with the layout of the terrain observed.

Figure 10:
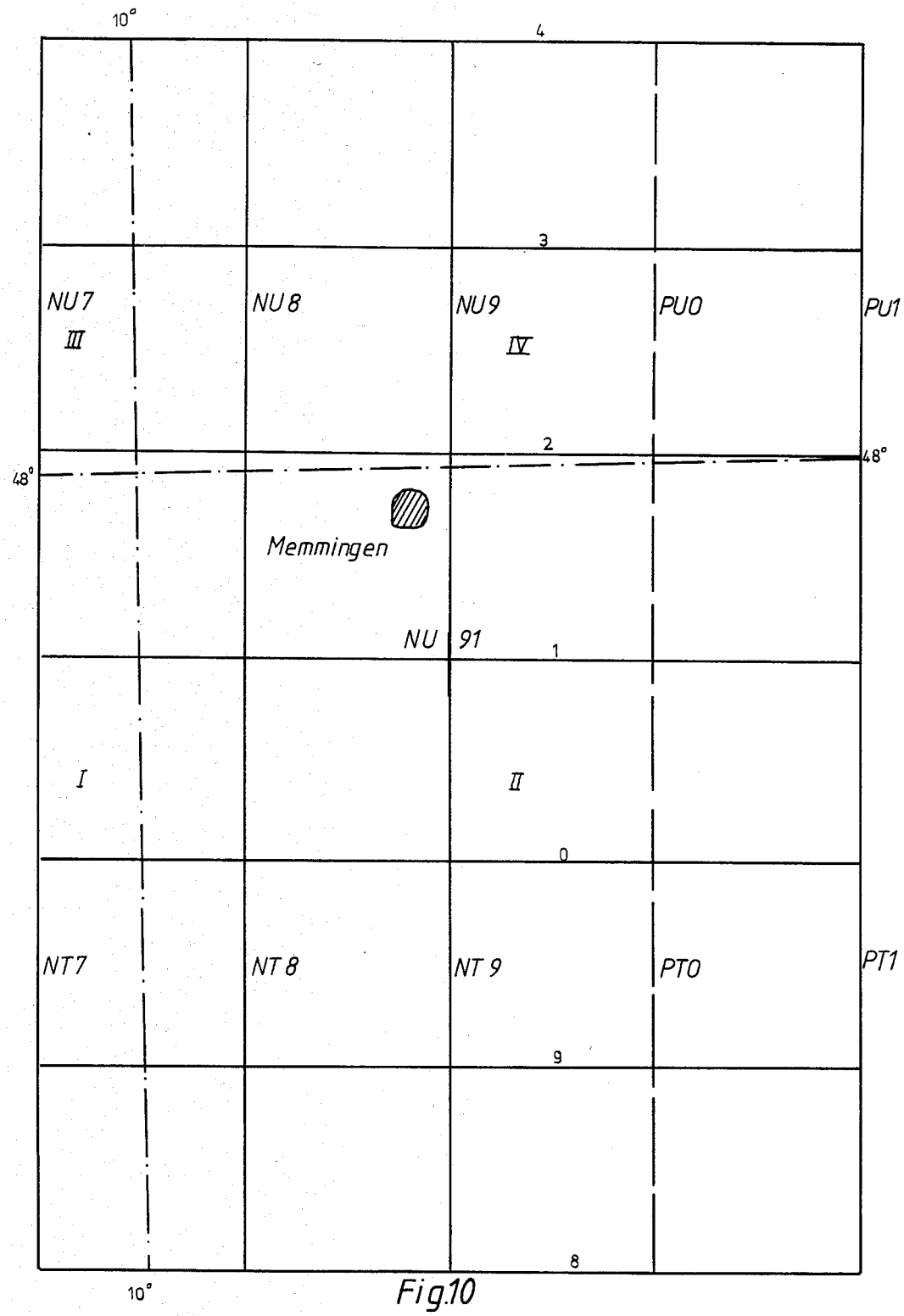
FIG. 10 shows an edge map sheet, which is composed of portions from four standard maps which are mounted in a common map pocket.

In a map pocket, a map sheet may be composed of marginal portions of different adjacent standard maps, as illustrated in FIG. 10.

Figure 11:
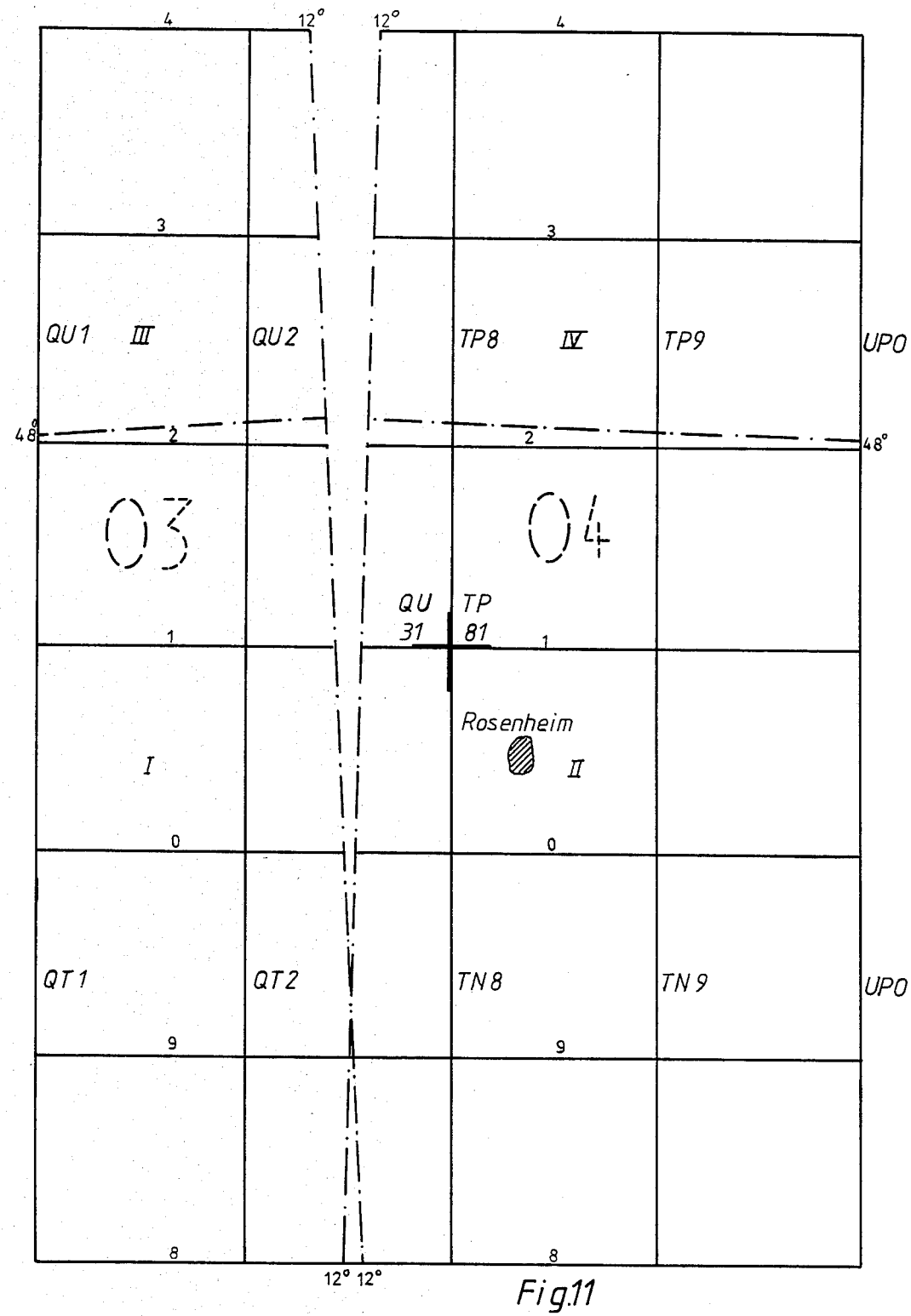
FIG. 11 shows two zone edge sheets, which show adjacent areas belonging to different zones of the UTM grid, the sheets being mounted in a common map pocket.
Figure 12:
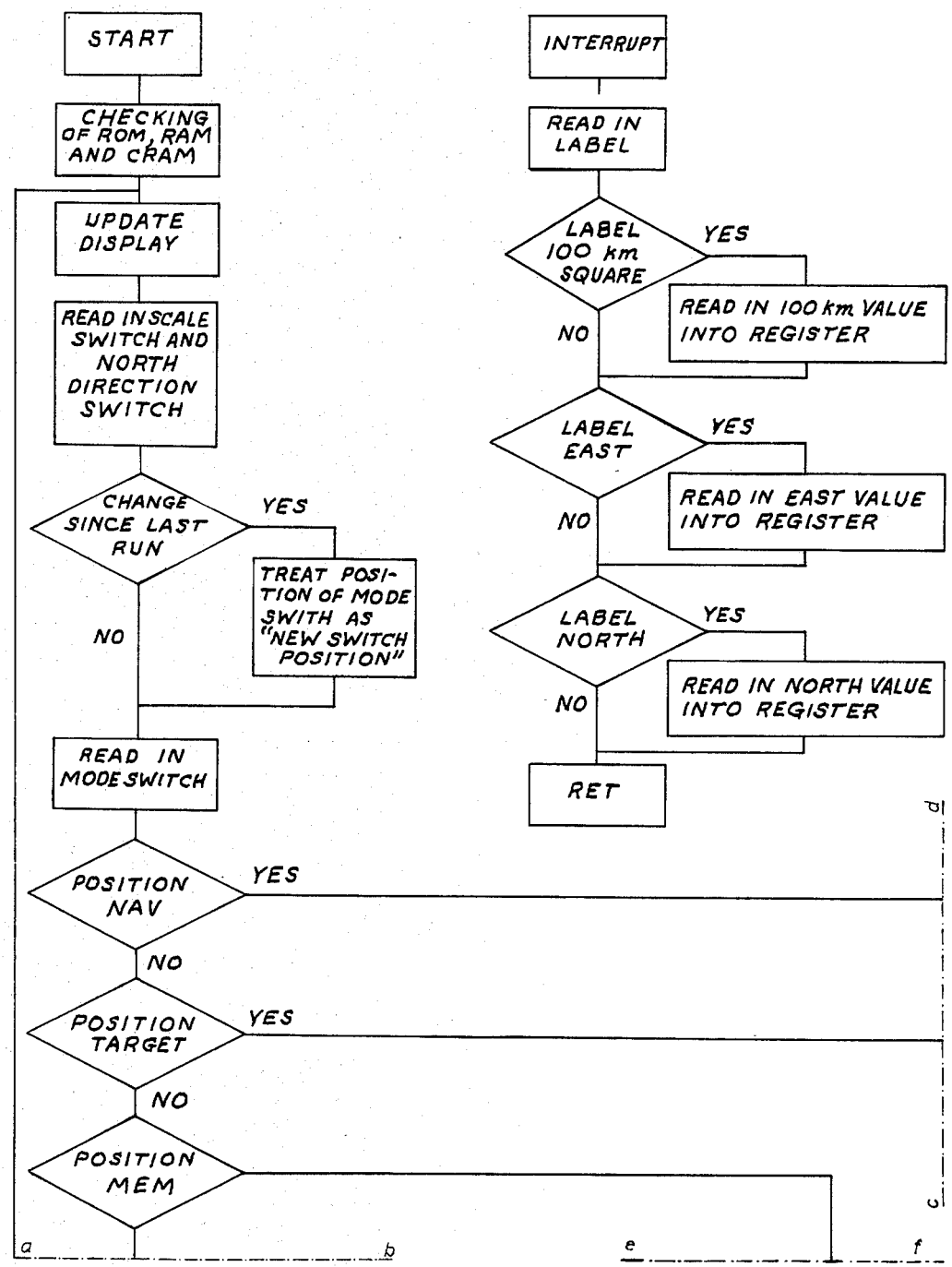
FIGS. 12A–12D are a flow diagram which illustrates the mode of operation of the position display instrument of the invention.
Figure 12B:
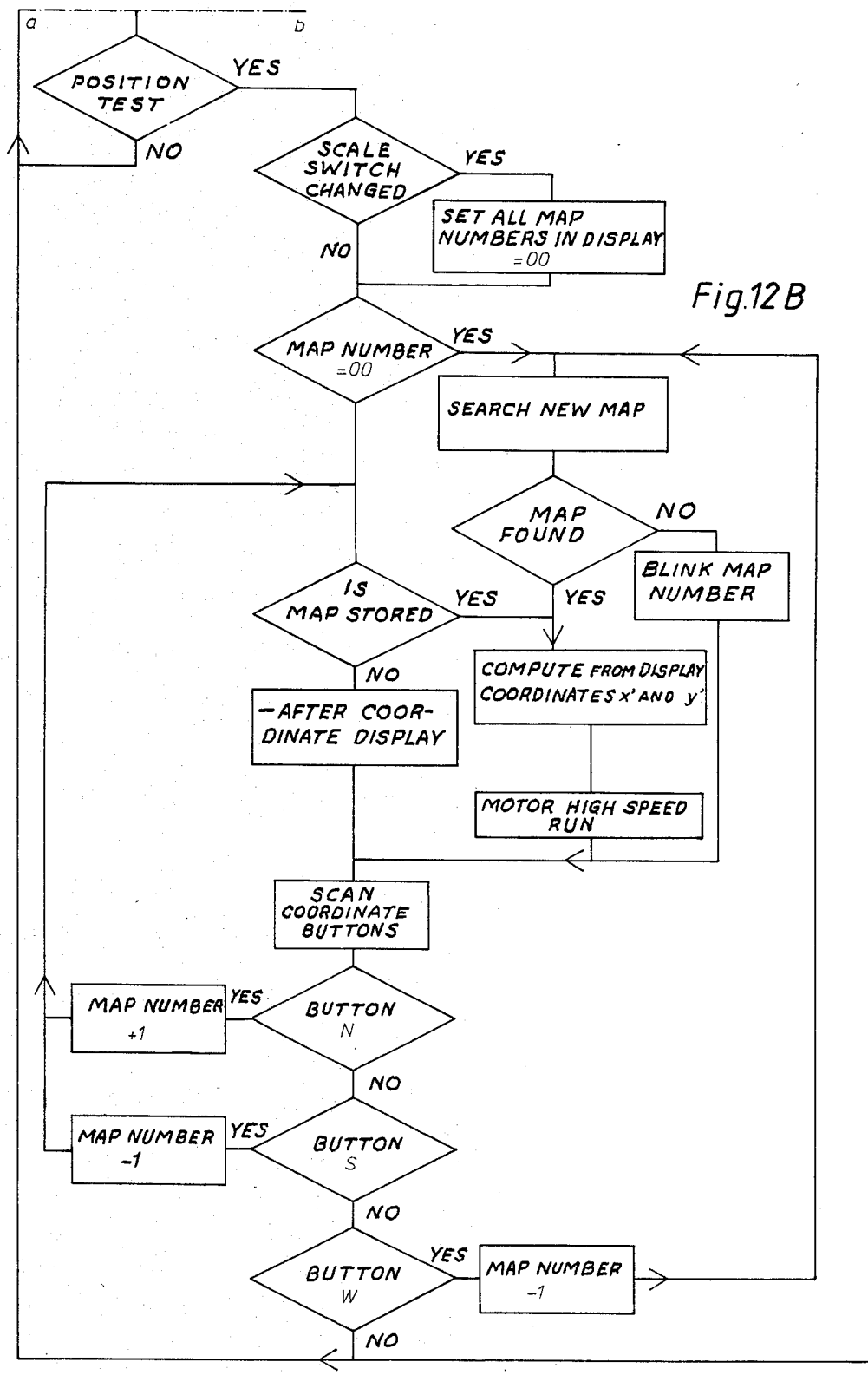

Two adjacent zone edge sheets, which belong to different UTM grid zones, can be mounted on a common, rectangular, transparent map carrier corresponding to the size of a normal map sheet, for example in the map pocket of FIG. 7, such that the lines of the two grids are parallel to the edges of the map carrier. The borderlines of the grid zones, which are defined by a line of longitude, run at different angles relative to the grid lines. From FIG. 11 it can be seen that the twelfth line of longitude, which defines the borderline between different UTM grid zones, runs at a different angle in the left zone edge sheet than in the right one, when the grid lines of the two grids are parallel to each other and to the edges of the map carrier. Each of the two zone edge sheets carriers a different designation (03 and 04, respectively) and is stored separately with its associated map data. The memory, therefore, contains the center coordinates QU31 for the map sheet 03 and the center coordinates TP81 for the map sheet 04. When the vehicle position provided by the position computer passes the twelfth circle of longitude, the position data are automatically given in coordinates of the next UTM grid zone. The microcomputer does not find these position data on the map sheet 03. It looks for another map sheet, into which these position data fit, and finds the map sheet 04, and the light spot is automatically moved into the position referenced to this map sheet. Therefore the light spot skips the gap formed in the map pocket between the two lines, each of which represents the twelfth lines of longitude, and then continues its path in the righthand map sheet 04.

When the rotary selector switch 76 is switched to the mode operation of "TARGET", the light spot can be displaced on the map to a target given therein, by means of the push buttons 78 to 84, which control the position readings in the windows 68 and 70. When the light spot is located on this target, the target coordinates can be read directly from the windows 68 and 70.

In the mode of operation, "TEST", the contents of the memory may be read out.

Also original maps may be used with the instrument instead of map sheets. "Map fields" are marked in the original maps by means of a template, said map fields being limited by grid lines of the UTM grid and, as the cut out map sheets, have a center on the intersection of two grid lines. These map fields are read in into the memory like the map sheets. In operation, the original map is folded along grid lines. The map is then clamped to the map holder in the correct position by means of a frame by magnetic action.

What is claimed is:

1. In a position display instrument for light spot display on a map of the position of vehicles, in particular aircraft or helicopters, comprising
a flat map holder for accommodating and holding map sheets in an exact position,
a light transmitter located below the map holder for producing a light spot on the map sheet and movable in two coordinates by positioning means,
a microcomputer, to which the grid coordinates of the vehicle position are applied from a navigational computer and by which the positioning means are controlled,
a memory for storing map data, said memory cooperating with the microcomputer, and
display means connected to the microcomputer and by which the map sheet or map field required for the respective grid coordinates is displayed, the improvement comprising:
(a) the microcomputer comprises means for forming $$x' = \frac{x - x_M}{M} + a$$

$$y' = \frac{y - y_M}{M} + b,$$

wherein
x,y are the grid coordinates of the vehicle position as provided by the navigational computer,
$x_M, y_M$ are the coordinates of the map center as provided by the memory,
M is the map scale and
a,b are the half the height and width dimensions, respectively, of the map sheet or map field,
(b) the light transmitter (122) is arranged by means of the positioning means (100,102,114,116), to automatically be positioned at the coordinates thus determined with respect to one map corner,
(c) means are provided for supplying an edge signal to the microcomputer when the light transmitter (122) reaches the edge of the map sheet or map field, and
(d) the microcomputer, when receiving the edge signal,
($d_1$) forms x' and y' consecutively for the various map data $x_M, y_M$ stored in the memory,
($d_2$) tests, each time, for the condition $$0 \leq x' < 2a$$

$$0 \leq y' < 2b$$

and,
($d_3$) when this condition is met
($d_{31}$) discontinues further testing, ($d_{32}$) supplies the identification of the associated new map sheet for display to the display means, and ($d_{33}$) controls the positioning means to move the light transmitter (122) into the position $$x' = \frac{x - x_{M1}}{M} + a$$

$$y' = \frac{y - y_{M1}}{M} + b \text{ and,}$$

($d_4$) when this condition is not met with any of the stored pairs $x_M, y_M$, provides a nil return.

2. Position display instrument as set forth in claim 1, including means for switching the control of the positioning means such that the light transmitter (122) is caused to be positioned at the point (2a-x', 2b-y').

3. Position display instrument as set forth in claim 1, in which the memory is an interchangeable, programmable read only memory (PROM).

4. Position display instrument as set forth in claim 1, in which
 (a) two adjacent zone edge sheets which belong to different UTM grid zones, are mounted on a common, rectangular, transparent map carrier (50) having the size of a normal map sheet such that the lines of both grids are parallel to the edges of the map carrier, and
 (b) a designation of each of the two zone edge sheets is stored separately with its associated map data in the memory.

* * * * *